G. W. FORBES.
CARBURETER.
No. 173,933. Patented Feb. 22, 1876.
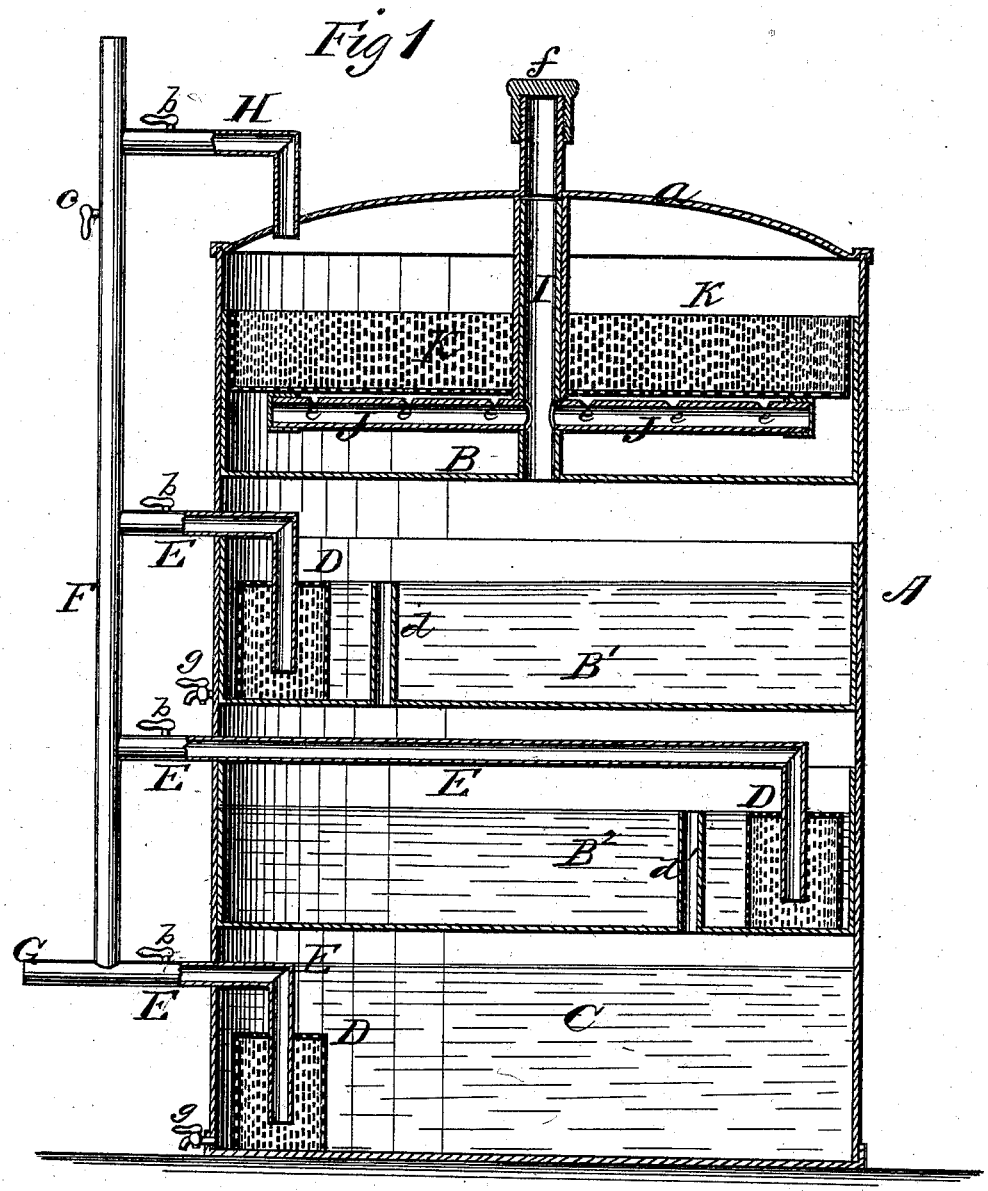

UNITED STATES PATENT OFFICE.

GEORGE W. FORBES, OF CINCINNATI, OHIO, ASSIGNOR OF TWO-THIRDS HIS RIGHT TO JAMES W. McMAKIN.

IMPROVEMENT IN CARBURETERS.

Specification forming part of Letters Patent No. 173,933, dated February 22, 1876; application filed December 4, 1875.

*To all whom it may concern:*

Be it known that I, GEORGE W. FORBES, of Cincinnati, in the county of Hamilton and State of Ohio, have invented a new and valuable improvement in carbonizing coal-gas and in vaporizing gasoline for making carbureted air-gas from gasoline; and I do hereby declare that the following is a full, clear, and exact description of the construction and operation of the same, reference being had to the annexed drawings making a part of this specification, and to the letters and figures of reference marked thereon.

Figure 1 of the drawings is a vertical central sectional view of my carbureter.

This invention has relation to improvements in gas or air carbureters; and it consists in the arrangement and novel construction of the various devices used, whereby very useful and desirable results are obtained, as will be hereinafter more fully explained and claimed.

In the annexed drawings, the letter A designates a preferably cylindrical metallic vessel, which is provided with three or more pans, B $B^1$ $B^2$, arranged the one above the other, and at a suitable distance apart, the lowermost pan being at a sufficient distance from the bottom of the vessel to form therewith a chamber, C. This chamber and pans $B^2$ $B^1$ are each provided with a perforated metallic agitating-vessel D, into which a pipe, E, extending downward nearly to the bottom of the chamber and pans, is received. These pipes extend through the wall of the vessel, and are joined in any suitable manner to a vertical pipe, F, terminating below in a feed-pipe, G, and communicating above with the upper part of vessel A through the medium of a pipe, H, which passes through the cover $a$ of vessel A, as shown in Fig. 1. Pipes E and H are provided with stop-cocks $b$, and pipe F has also a stop-cock, $c$, the functions of which will hereinafter more fully appear, the cock $c$ being situated near eduction-pipe H above the upper pipe E. I represents a metallic pipe extending through the top of vessel A and the bottom of pan B, by means of which gasoline or any other suitable hydrocarbon fluid is introduced into vessel A. This fluid will pour into pan $B^1$ until it reaches the level of agitator D, when any excess will be discharged through an overflow-pipe, $d$, extending through the bottom of the said pan into pan $B^2$, from which it will escape, when it reaches the top of agitator D, through an overflow-pipe, $d'$, into chamber C. The feeder I is provided with a transverse pipe, J, provided with perforations $e$, above which is arranged a reticulated crate or pan, K, containing pebbles, lime, charcoal, or any other suitable purifying-material. It has also a screw-cap, $f$, upon its upper end, which will prevent any escape of gas or vapor after the charge of hydrocarbon fluid has been introduced into the vessel A.

The operation of my improved carbureter is as follows: The gas to be enriched is let into the carbureter through induction-pipe G and the lower pipe E, from which it is discharged into the perforated vessel D in chamber C, from which vessel it escapes in every direction through the numerous perforations formed in its sides. In its escape from vessel D it violently agitates the gasoline, greatly accelerating its volatilization, and effectually preventing stratification. The gas and vapors arising from the hydrocarbon fluid pass upward through overflow-pipes $d$ $d'$ and I into the perforated pipe J, from which it passes, through perforations $e$ upward through the purifying-material in the reticulated tray K, into the upper part of vessel A, whence it will escape through outlet-pipe H, stop-cock $b$ being open into a storing-tank or directly to the burners. When the hydrocarbon fluid in chamber C has become heavy and thick, the gas will be cut off therefrom by means of stop-cock $b$ in the lower pipe E, when it will pass upward through pipes F E into pan $B^2$, containing fluid hydrocarbon but little, if at all, volatilized, when the process above described for the chamber C will be repeated for pan $B^2$. This process will be renewed as the volatile vapors in each pan are evaporated until the entire charge is exhausted, when the residuum may be drawn off through a stop-cock, $g$, in the bottom of chamber C and of each of the pans $B^1$ $B^2$. The apparatus will thus be ready for a new charge.

The effect of this construction is that great uniformity in the candle-power of the enriched gas is obtained, for the reason that as each lower pan or chamber ceases to throw off vapors in sufficient quantity an upper pan or chamber containing fresh hydrocarbon fluid will be thrown open, thus renewing the supply and maintaining a high illuminating-power of the gas.

It is evident that the agitation above described, and the consequent volatilization, may be carried on in two or more or in all of the pans and chambers at the same time; also, that when the contents of a single pan are agitated at a time I may commence with the upper pan $B^1$ and end with chamber C, as above described. This will be accomplished by a suitable opening and closing of cocks $b$, according to the result desired to be produced.

In lieu of gas, air may be carbureted in the same manner, and with equally good effect.

What I claim as new, and desire to secure by Letters Patent, is—

1. In a carbureter, a feeder, I, having transversed gas-distributing pipes J, in combination with a purifier, K, substantially as and for the purpose set forth.

2. In combination with the vessel A, having spaced pans $B^1$ $B^2$, with overflow-tubes $d$ $d'$ and perforated agitating-vessels D, the pan B, having reticulated crate K, containing a purifying substance, and the hydrocarbon feed-pipe I, having distributing-tube J, substantially as specified.

In testimony that I claim the above I have hereunto subscribed my name in the presence of two witnesses.

GEORGE W. FORBES.

Witnesses:
 HENRY SNOW,
 ALEX. BUCKINGHAM.